(12) United States Patent
Beach et al.

(10) Patent No.: US 11,396,319 B2
(45) Date of Patent: Jul. 26, 2022

(54) STEERING COLUMN JACKET STIFFENING SLEEVE

(71) Applicant: Steering Solutions IP Holding Corporation, Saginaw, MI (US)

(72) Inventors: Timothy D. Beach, Saginaw, MI (US); Robert D. Maida, Pinconning, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/101,568

(22) Filed: Nov. 23, 2020

(65) Prior Publication Data
US 2022/0161840 A1    May 26, 2022

(51) Int. Cl.
*B62D 1/16* (2006.01)

(52) U.S. Cl.
CPC .................................... *B62D 1/16* (2013.01)

(58) Field of Classification Search
CPC ........................................................ B62D 1/16
See application file for complete search history.

(56) References Cited

U.S. PATENT DOCUMENTS

| | | | | |
|---|---|---|---|---|
| 3,665,777 A | * | 5/1972 | Jensen | B62D 1/192 74/492 |
| 3,699,824 A | * | 10/1972 | Staudenmayer | B62D 1/192 74/492 |
| 3,788,148 A | * | 1/1974 | Connell | F16C 33/40 74/492 |
| 6,371,519 B1 | * | 4/2002 | Jurik | B62D 1/192 280/777 |
| 8,549,953 B2 | * | 10/2013 | Schnitzer | B62D 1/185 74/493 |
| 2005/0087970 A1 | * | 4/2005 | Ulintz | F16C 29/002 280/775 |

FOREIGN PATENT DOCUMENTS

| | | | | |
|---|---|---|---|---|
| DE | 102014102661 B3 | * | 4/2015 | B62D 1/184 |
| JP | 3158007 B2 | * | 4/2001 | B62D 1/192 |
| KR | 19990016148 U | * | 5/1999 | |
| KR | 19990037708 U | * | 10/1999 | |
| KR | 20000006057 U | * | 4/2000 | |
| KR | 101784803 B1 | * | 10/2017 | B62D 6/10 |

* cited by examiner

*Primary Examiner* — Jonathan Ng
*Assistant Examiner* — Scott F. Underwood
(74) *Attorney, Agent, or Firm* — Dickinson Wright PLLC

(57) ABSTRACT

A steering column assembly includes a jacket having a first end, a second end, a jacket length, and an inner surface defining a bore. The steering column assembly also includes a steering shaft having an outer surface and a shaft length, at least a portion of the steering shaft located within the bore defined by the inner surface of the jacket. The steering column assembly further includes a stiffening sleeve having a radially inner surface, a radially outer surface, and a sleeve length, wherein the radially outer surface of the stiffening sleeve is fixed to the inner surface of the jacket.

12 Claims, 4 Drawing Sheets

STEERING COLUMN JACKET STIFFENING SLEEVE

FIELD OF THE INVENTION

The present disclosure relates to vehicle steering systems and, more particularly, to a stiffening sleeve for a steering column jacket.

BACKGROUND

Steering columns typically include a jacket assembly, which may include an upper jacket and a lower jacket. The upper jacket is sensitive to both vertical and lateral natural frequency. Increasing the material thickness of the entire upper jacket will result in an increase in the vertical and lateral natural frequency, but such a change also undesirably increases the upper jacket mass.

SUMMARY

According to one aspect of the disclosure, a steering column assembly includes a jacket having a first end, a second end, a jacket length, and an inner surface defining a bore. The steering column assembly also includes a steering shaft having an outer surface and a shaft length, at least a portion of the steering shaft located within the bore defined by the inner surface of the jacket. The steering column assembly further includes a stiffening sleeve having a radially inner surface, a radially outer surface, and a sleeve length, wherein the radially outer surface of the stiffening sleeve is fixed to the inner surface of the jacket.

According to another aspect of the disclosure, a steering column assembly includes a jacket having an inner diameter, a first end, a second end, and an outer jacket length. The steering column assembly also includes an inner steering shaft having an outer diameter and a length. The steering column assembly further includes a bearing between the inner diameter of the outer jacket and the outer diameter of the inner steering shaft, the bearing located at an end of the outer jacket, and the bearing radially supporting the inner steering shaft. The steering column assembly yet further includes a sleeve having an inner diameter, an outer diameter, a first end, a second end, and a sleeve length less than the outer jacket length. The steering column assembly also includes the sleeve located such that the outer diameter of the sleeve is in contact with the inner diameter of the outer jacket, and an end of the sleeve is not adjacent to an end of the outer jacket.

According to yet another aspect of the disclosure, a method of fixing a sleeve inside the other jacket of a steering column assembly is provided. The method includes an outer jacket having an inner diameter, a first end, a second end, and an outer jacket length. The method also includes an inner steering shaft having an outer diameter and a length. The method further includes a sleeve having an inner diameter, and outer diameter, and a sleeve length. The sleeve has a maximum outer diameter larger than the inner diameter of the outer jacket. The method yet further includes press-fitting the sleeve entirely inside the outer jacket such that the outer diameter of the sleeve is rigidly connected to the inner diameter of the outer jacket.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a stiffening sleeve for a steering column is shown.

Figure 1:
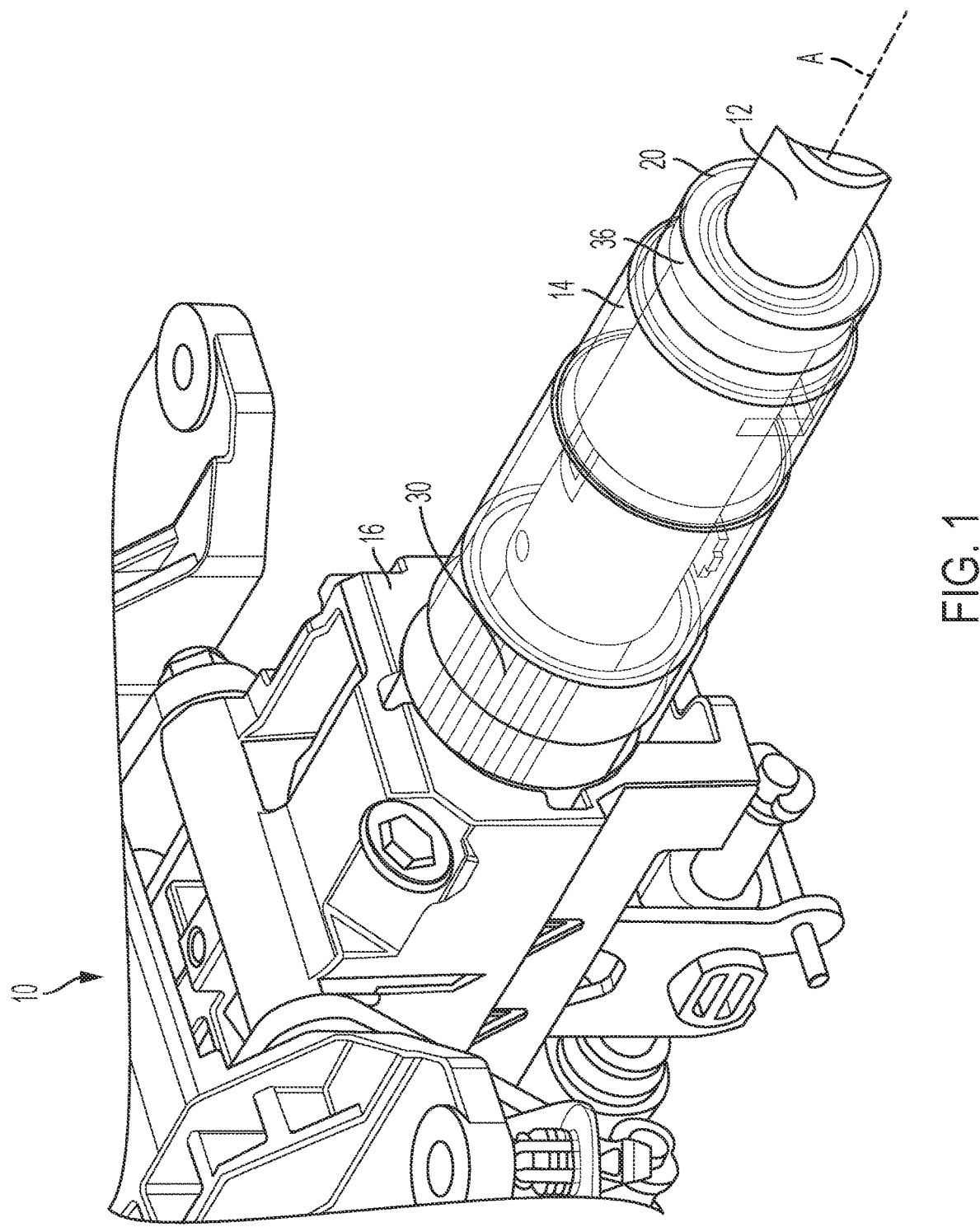
FIG. 1 is a perspective view of a steering column having a stiffening sleeve.
Figure 2:
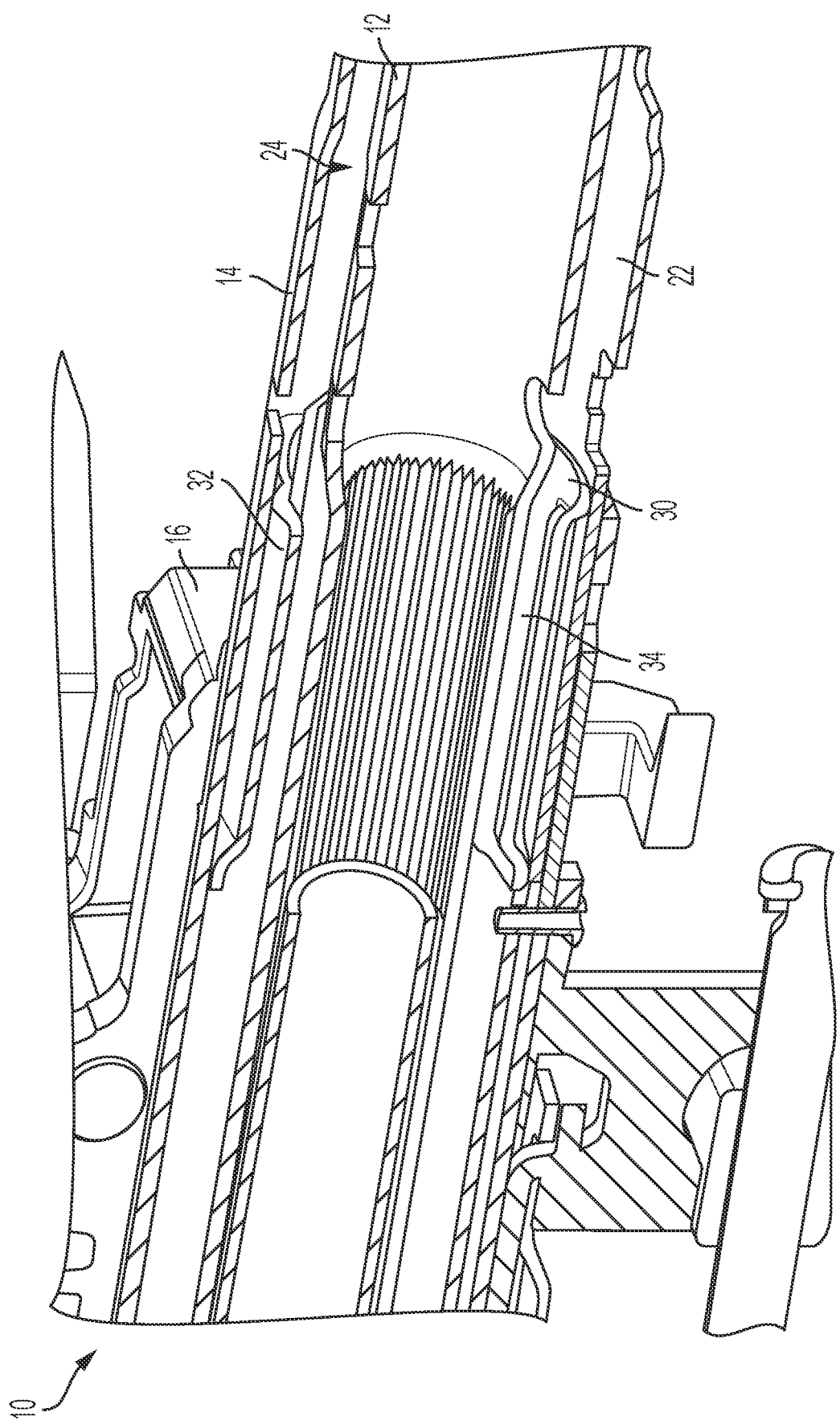
FIG. 2 is a cross-sectional view of the steering column.

Referring to FIGS. 1 and 2, a steering column is illustrated and generally referenced with numeral 10. The steering column 10 substantially extends along a longitudinal axis A. The steering column 10 may be adjustable in a telescopic direction parallel to the longitudinal axis A (i.e., the steering column 10 is axially adjustable along the longitudinal axis A). More specifically, the steering column includes a steering shaft 12 rotatably disposed within a column assembly that includes an upper jacket 14 and a lower jacket 16. The steering shaft 12 may be one of a plurality of operatively coupled steering shafts in some embodiments. A steering wheel (not shown) is configured to be mounted to the steering shaft 12. The column jackets 14, 16 and the steering shaft 12 substantially extend along the longitudinal axis A.

The upper jacket 14 extends from a first end 20 to a second end (not shown) to define a jacket length. An inner surface 22 of the upper jacket 14 defines a jacket bore 24. A portion of the length of the steering shaft 12 is positioned within the jacket bore 24, with an end of the steering shaft 12 protruding from the first end 20 of the upper jacket 14 for attachment of the steering wheel.

The upper jacket 14 is subjected to various forces that result in vibration which incurs vertical and lateral natural frequency occurrences. The embodiments disclosed herein provide a stiffening sleeve 30 to increase stiffness of the upper jacket 14 and the overall steering column 10. The increased stiffness leads to increased natural frequency of the upper jacket 14, while minimizing the mass added to the steering column 10.

The stiffening sleeve 30 is located between an outer surface 24 of the steering shaft 12 and the inner surface 22 of the upper jacket 14. The stiffening sleeve 30 has a length is localized to a region of the upper jacket 14 that experiences the most significant strain. Therefore, the stiffening sleeve 30 has a length that is less than the jacket length of the upper jacket 14. This provides stiffening of the upper jacket 14, while avoiding the unnecessary thickening of the entire upper jacket 14, or a large portion thereof.

The stiffening sleeve 30 includes a radially outer surface 32 and a radially inner surface 34. The stiffening sleeve 30 may be formed of any suitable material. In some embodiments, the stiffening sleeve 30 is formed of a metallic construction. In other embodiments, the stiffening sleeve 30 is laminated with foam disposed between the radially inner surface 34 and the radially outer surface 32. The preceding examples are merely illustrative of the materials that the stiffening sleeve 30 may be formed of and are not intended to be limiting.

The radially outer surface 32 is fixed to the inner surface 22 of the upper jacket 14. The steering shaft 12 is radially supported within the jacket bore 24, at least in part, by a bearing 36 positioned within the jacket bore 24 near the first end 20 of the upper jacket 14. The steering shaft 12 is able to rotate therein in response to steering maneuvers and inputs. The stiffening sleeve 30 may be fixed within the jacket bore 24 in various contemplated manners. In some embodiments, the stiffening sleeve 30 is press fit within annulus defined by the outer surface 24 of the steering shaft 12 and the inner surface 22 of the upper jacket 14. Such an embodiment includes an outer diameter of the stiffening sleeve 30 being larger than the inner diameter of the upper jacket 14 and an inner diameter of the stiffening sleeve 30 that is positioned to be in contact with the outer surface 24 of the steering shaft 12 in an uninstalled condition of the stiffening sleeve 30. This dimensioning allows the stiffening sleeve 30 to be press fit within the annulus. However, other methods of fixing the stiffening sleeve 30 to the upper jacket 14 and/or the steering shaft 12 are contemplated.

Positioning the stiffening sleeve 30 within the annulus and in contact with the inner surface 22 of the outer jacket 14 provides a stiffer region of the upper jacket 14, thereby increasing the natural frequency response of the upper jacket.

The stiffening sleeve 30 may be constructed in various forms. In the embodiments of FIGS. 1 and 2, the stiffening sleeve 30 extends continuously in a circumferential direction (i.e., 360 degrees). In the illustrated embodiment of FIGS. 1 and 2, the radially outer surface 32 of the stiffening sleeve 30 is not of a constant outer diameter. In other words, the radially outer surface 32 includes recesses, indentations, or the like. Alternatively, the radially outer surface 32 may include protrusions. Any combination of recesses and protrusions may also be utilized. This may be also be referred to as a "corrugated" outer surface.

Figure 3:
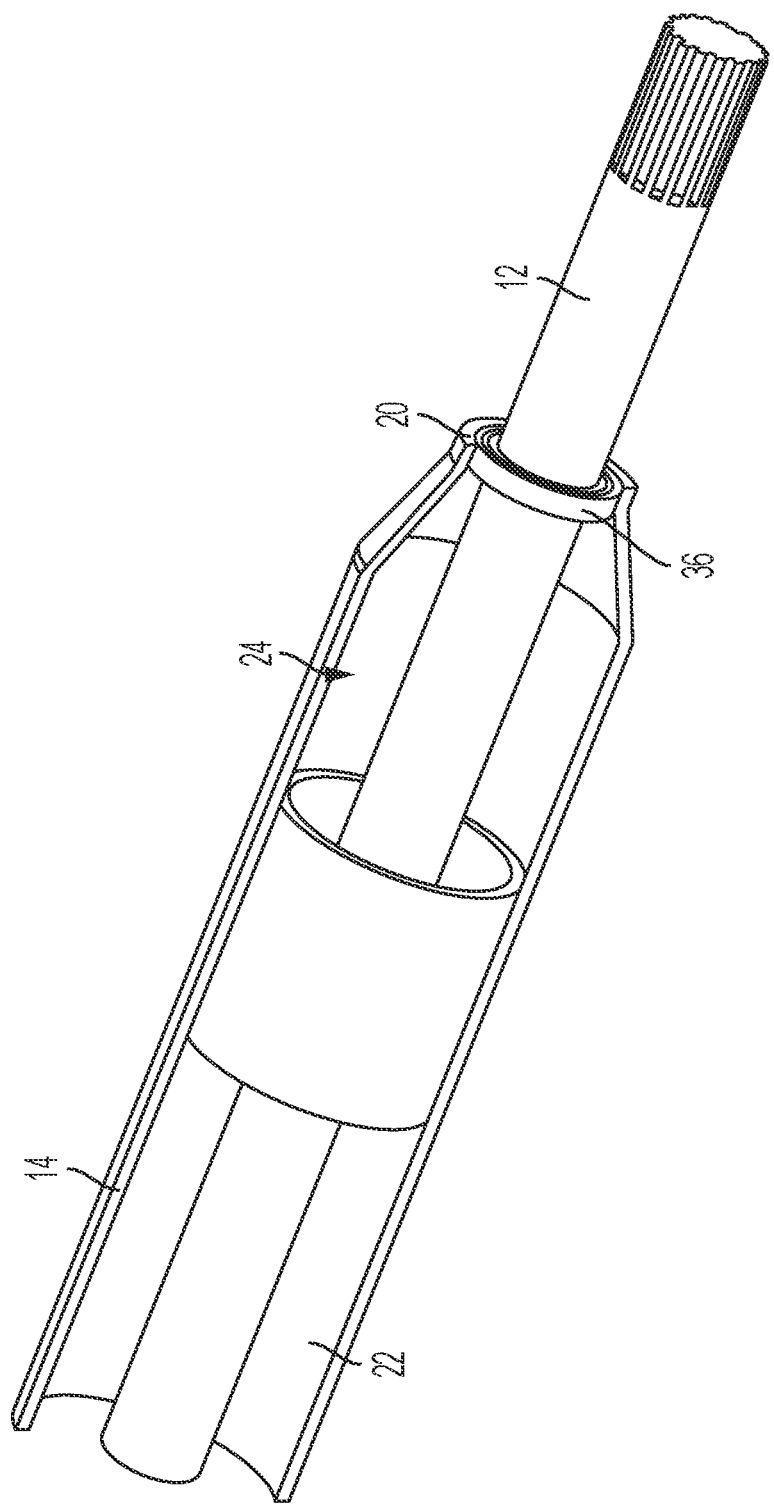
FIG. 3 is a partial cross-sectional view of the steering column illustrating the stiffening sleeve according to another aspect of the disclosure.

Referring now to FIG. 3, another variation of the radially outer surface 32 of the stiffening sleeve 30 is shown. In the illustrated embodiment, the stiffening sleeve 30 is cylindrical by extending continuously in the circumferential direction (i.e. 360 degrees). Additionally, the radially outer surface 32 of the stiffening sleeve 30 is smooth and has a constant cross-section. Specifically, the outer diameter of the stiffening sleeve 30 is constant.

Figure 5:
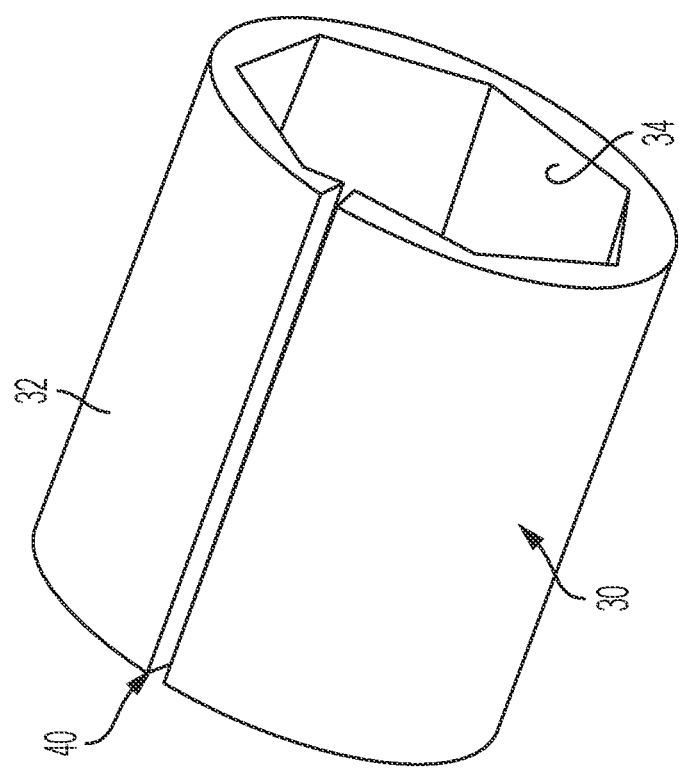
FIG. 5 is a perspective view of the stiffening sleeve according to another aspect of the disclosure.
Figure 4:
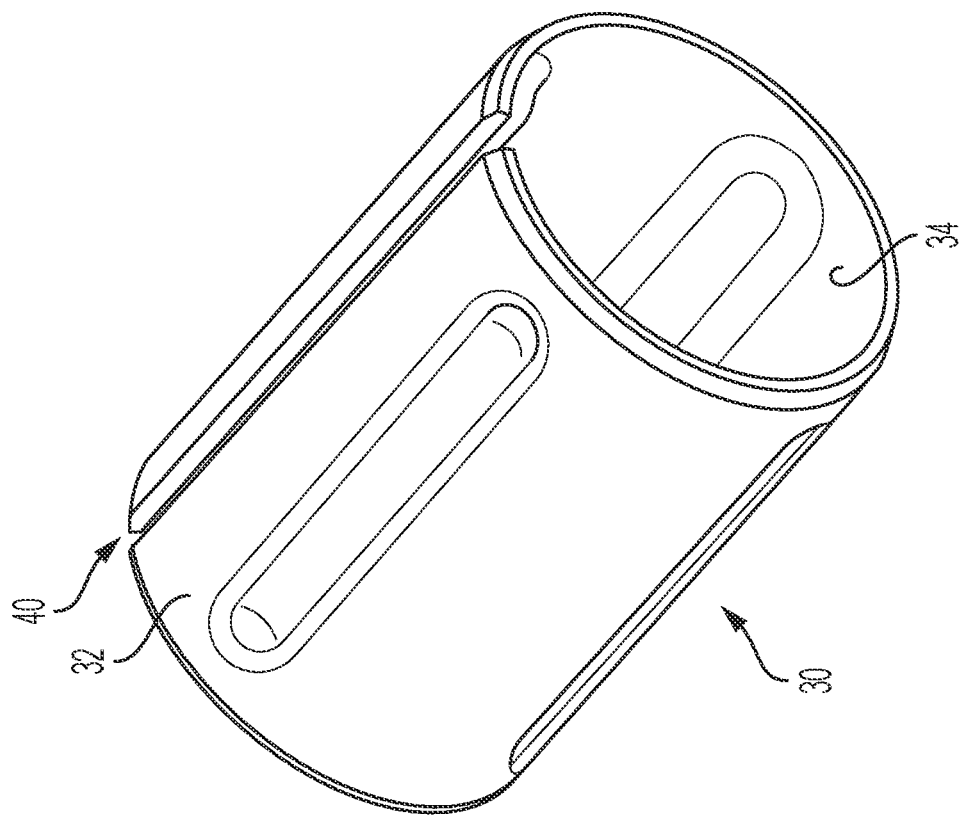
FIG. 4 is a perspective view of the stiffening sleeve according to another aspect of the disclosure.

Referring to FIGS. 4 and 5, other variations of the stiffening sleeve 30 are shown. As illustrated, the stiffening sleeve 30 does not extend continuously 360 degrees in the circumferential direction. Rather, a break 40 occurs to allow the stiffening sleeve 30 to flex during installation into the annulus defined by the upper jacket 14 and the steering shaft 12. FIG. 4 shows the radially outer surface 32 with recesses and/or protrusions. FIG. 5 shows the radially outer surface 32 with a smooth and constant cross-section.

The embodiments disclosed herein provide a localized stiffening sleeve 30 to improve natural frequency, while avoiding a substantial increase in the overall steering column upper jacket material thickness. This is beneficial in achieving both the natural frequency and mass targets required by the OEMs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a jacket having a first end, a second end, a jacket length, and an inner surface defining a bore;
   a steering shaft having an outer surface and a shaft length, at least a portion of the steering shaft located within the bore defined by the inner surface of the jacket; and
   a stiffening sleeve having a radially inner surface, a radially outer surface, and a sleeve length, wherein the radially outer surface of the stiffening sleeve is fixed to the inner surface of the jacket, wherein the stiffening sleeve is non-cylindrical, wherein the cross-section of the stiffening sleeve is non-uniform over the sleeve length.

2. The steering column assembly of claim 1, further comprising a bearing disposed between the jacket and the steering shaft, the bearing radially supporting the steering shaft, wherein the bearing is positioned near the first end of the jacket.

3. The steering column assembly of claim 1, wherein an outer diameter of at least a portion of the radially outer surface of the stiffening sleeve is larger than an inner diameter of at least a portion of the inner surface of the jacket in an uninstalled condition of the stiffening sleeve.

4. The steering column assembly of claim 1, wherein the sleeve length is less than the jacket length.

5. The steering column assembly of claim 1, wherein the stiffening sleeve is metallic.

6. The steering column assembly of claim 1, wherein the radially outer surface of the stiffening sleeve includes a corrugated portion.

7. The steering column assembly of claim 1, wherein the stiffening sleeve is laminated with foam disposed between the radially inner surface and the radially outer surface of the stiffening sleeve.

8. The steering column assembly of claim 1, wherein the radially outer surface of the stiffening sleeve includes a plurality of recesses.

9. A steering column assembly comprising:
   a jacket having an inner diameter, a first end, a second end, and an outer jacket length;
   an inner steering shaft having an outer diameter and a length;
   a bearing between the inner diameter of the outer jacket and the outer diameter of the inner steering shaft, the bearing located at an end of the outer jacket, and the bearing radially supporting the inner steering shaft;
   a sleeve having an inner diameter, an outer diameter, a first end, a second end, and a sleeve length less than the outer jacket length; and
   the sleeve located such that the outer diameter of the sleeve is in contact with the inner diameter of the outer jacket, and an end of the sleeve is not adjacent to an end of the outer jacket, wherein the sleeve is non-cylindrical, wherein the cross section of the sleeve is non-uniform over the length of the sleeve.

10. The steering column assembly as described in claim 9, wherein the outer diameter of the sleeve is larger than the inner diameter of the outer jacket.

11. The steering column assembly as described in claim 9, wherein the sleeve is of metallic construction.

12. A steering column assembly comprising:
a jacket having an inner diameter, a first end, a second end, and an outer jacket length;
an inner steering shaft having an outer diameter and a length;
a bearing between the inner diameter of the outer jacket and the outer diameter of the inner steering shaft, the bearing located at an end of the outer jacket, and the bearing radially supporting the inner steering shaft;
a sleeve having an inner diameter, an outer diameter, a first end, a second end, and a sleeve length less than the outer jacket length; and
the sleeve located such that the outer diameter of the sleeve is in contact with the inner diameter of the outer jacket, and an end of the sleeve is not adjacent to an end of the outer jacket, wherein the cross section of the sleeve is non-continuous, wherein the sleeve is non-cylindrical, wherein the cross section of the sleeve is non-uniform over the length of the sleeve.

\* \* \* \* \*